US010465563B2

(12) United States Patent
Kunihiro

(10) Patent No.: US 10,465,563 B2
(45) Date of Patent: Nov. 5, 2019

(54) METHOD FOR CONTROLLING COOLING SYSTEM OF GAS TURBINE, CONTROL DEVICE PERFORMING THE SAME, AND GAS TURBINE PLANT COMPRISING THE CONTROL DEVICE

(71) Applicant: MITSUBISHI HEAVY INDUSTRIES, LTD., Tokyo (JP)

(72) Inventor: Akihito Kunihiro, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 287 days.

(21) Appl. No.: 13/774,409

(22) Filed: Feb. 22, 2013

(65) Prior Publication Data

US 2014/0083108 A1    Mar. 27, 2014

(30) Foreign Application Priority Data

Sep. 27, 2012  (JP) ................................. 2012-215127

(51) Int. Cl.
*F02C 7/14*        (2006.01)
*F01K 19/10*      (2006.01)
(Continued)

(52) U.S. Cl.
CPC .............. *F01K 19/10* (2013.01); *F01K 23/10* (2013.01); *F02C 7/143* (2013.01)

(58) Field of Classification Search
CPC .......... Y02E 20/16; Y02T 50/675; F02C 7/18; F02C 7/2365; F02C 7/143; F02C 7/224;
(Continued)

(56) References Cited

U.S. PATENT DOCUMENTS 5,794,448 A  *  8/1998  Fujioka et al. .................. 60/736
5,826,430 A  *  10/1998  Little .............................. 60/736
(Continued)

FOREIGN PATENT DOCUMENTS

CN        101517213 A     8/2009
JP         62-26329 A       2/1987
(Continued)

OTHER PUBLICATIONS

International Search Report of PCT/JP2013/054727, dated May 14, 2013.
(Continued)

*Primary Examiner* — Arun Goyal
(74) *Attorney, Agent, or Firm* — Westerman, Hattori, Daniels & Adrian, LLP

(57) ABSTRACT

A gas turbine cooling system of the present invention includes a cooler that cools compressed air extracted from an air compressor to make cooling air, a cooling air compressor that supplies the cooling air to a combustion liner of a combustor, and an IGV that regulates a flow rate of the cooling air. The control device of the gas turbine cooling system includes a target value setting part that determines a target value with respect to a flow rate equivalent value of the cooling air according to detected temperature of the cooling air, a correction driving amount calculation part that obtains a correction driving amount which reduces a deviation of detected flow rate equivalent value of the cooling air with respect to the target value, and a drive command output part that outputs a drive command corresponding to the correction driving amount to the IGV.

19 Claims, 6 Drawing Sheets

(51) Int. Cl.
*F02C 7/143* (2006.01)
*F01K 23/10* (2006.01)

(58) Field of Classification Search
CPC .... F02C 6/08; F02C 3/08; F01D 25/12; F01D 21/003; F04D 27/0207; F23M 11/045
USPC ...... 60/782, 785, 806, 726, 795, 803, 39.83, 60/728, 736
See application file for complete search history.

(56) References Cited

U.S. PATENT DOCUMENTS

| | | | |
|---|---|---|---|
| 2001/0022087 A1 | 9/2001 | Kobayashi et al. | |
| 2003/0121268 A1 | 7/2003 | Erickson | |
| 2009/0133400 A1* | 5/2009 | Callas | 60/730 |
| 2009/0260342 A1* | 10/2009 | Ishiguro et al. | 60/39.511 |
| 2012/0111020 A1* | 5/2012 | Bozzi et al. | 60/782 |

FOREIGN PATENT DOCUMENTS

| | | | |
|---|---|---|---|
| JP | 07-189740 A | 7/1995 | |
| JP | 11-50809 A | 2/1999 | |
| JP | 11-117714 A | 4/1999 | |
| JP | 2000-265856 A | 9/2000 | |
| JP | 2007-16791 A | 1/2007 | |
| JP | 2007-077866 A | 3/2007 | |
| JP | 2008-291829 A | 12/2008 | |
| JP | 2010-209721 A | 9/2010 | |
| JP | 2012-077660 A | 4/2012 | |
| JP | 2012-82829 A | 4/2012 | |
| KR | 10-2009-0045392 A | 5/2009 | |
| WO | 01/34956 A1 | 5/2001 | |
| WO | 2010/001655 A1 | 1/2010 | |

OTHER PUBLICATIONS

Written Opinion of PCT/JP2013/054727, dated May 14, 2013.
Office Action dated Jun. 30, 2015, issued in counterpart Japanese Patent Application No. 2012-215127, with English translation (6 pages).
Office Action dated Feb. 3, 2016, issued in counterpart German Patent Application No. 11 2013 004 755.1, with English translation. (24 pages).
Office Action dated Oct. 30, 2015, issued in counterpart Chinese Patent Application No. 201380038403.9, with English translation. (26 pages).
Office Action dated Oct. 27, 2015, issued in counterpart Korean Patent Application No. 10-2015-7002353, with English translation. (4 pages).

* cited by examiner

METHOD FOR CONTROLLING COOLING SYSTEM OF GAS TURBINE, CONTROL DEVICE PERFORMING THE SAME, AND GAS TURBINE PLANT COMPRISING THE CONTROL DEVICE

TECHNICAL FIELD

The present invention relates to a method for controlling a cooling system of a gas turbine for cooling a high temperature portion that is exposed to combustion gas in a gas turbine, a control device performing the same, and a gas turbine plant including the control device.

The present invention claims priority on Japanese Patent Application No. 2012-215127, filed Sep. 27, 2012, the content of which is incorporated herein by reference.

BACKGROUND ART

A gas turbine includes an air compressor that compresses outside air and generates compressed air, a plurality of combustors that combusts a fuel in the compressed air and generates a combustion gas, and a turbine that is driven by the combustion gas. In the gas turbine, since a combustion liner of the combustor, a blade or a vane of the turbine, or the like is exposed to the combustion gas of high temperature, it is necessary to protect the high temperature portions from heat of the combustion gas by cooling the high temperature portions.

Patent Document 1 below discloses a cooling system for cooling a transition piece (combustion liner) of the combustor which is a portion of the high temperature portions of the gas turbine. The cooling system includes a cooler that cools compressed air extracted from an air compressor and a cooling air compressor that pressurizes the compressed air cooled by the cooler and supplies the compressed air to a transition piece of a combustor as cooling air.

PRIOR ART DOCUMENT

Patent Document

[Patent Document 1] Japanese Unexamined Patent Application, First Publication No. 2000-265856

DISCLOSURE OF THE INVENTION

Problem that the Invention is to Solve

In order to prevent burnout of high temperature portions, it is necessary to supply a sufficient flow rate of cooling air to the high temperature portions such as the combustion liner of the combustor. On the other hand, if the flow rate of the cooling air is increased, not only the power of the cooling air compressor is increased, but also an exchange heat quantity that cools the compressed air is increased, and thus, the electric power generation efficiency of the gas turbine is decreased. In the cooling system described in Patent Document 1, a specific control method of the cooling air for simultaneously achieving cooling of the high temperature portions of the gas turbine and efficiency of the gas turbine is not disclosed at all.

Therefore, in order to solve the above-described problem, an object of the present invention is to provide a method for controlling a cooling system of a gas turbine capable of sufficiently cooling the high temperature portions of the gas turbine and improving the electric power generation efficiency of the gas turbine, a control device performing the same, and a gas turbine plant including the control device.

Means for Solving the Problem

According to an aspect of the present invention, there is provided a method for controlling a cooling system of a gas turbine, the cooling system being provided with a cooler which cools compressed air extracted from an air compressor of the gas turbine to make cooling air, and a cooling air compressor that supplies the cooling air to a high temperature portion exposed to a combustion gas in the gas turbine, the method including the steps of: determining a target value with respect to a flow rate equivalent value of the cooling air supplied to the high temperature portion corresponding to a detected temperature of the cooling air, using a target value setting function that determines a relationship between the target value and a temperature of the cooling air; calculating a correction driving amount which reduces a deviation of the detected flow rate equivalent value of the cooling air with respect to the target value, as a correction driving amount of a cooling air flow regulator that regulates a flow rate of the cooling air; and outputting a drive command corresponding to the correction driving amount to the cooling air flow regulator.

If the flow rate equivalent value of the cooling air is controlled to be the target value by regulating the driving amount of the cooling air flow regulator, the flow rate of the cooling air supplied to the high temperature portion of the gas turbine becomes approximately the target value. However, even though the flow rate of the cooling air supplied to the high temperature portion can be controlled, if the cooling air cannot be controlled to the flow rate matching the temperature of the cooling air, the temperature of the high temperature portion cannot be managed to be less than or equal to a predetermined temperature. Therefore, in the control method, the target value of the flow rate equivalent value corresponding to the temperature of the cooling air supplied to the high temperature portion is determined and the flow rate equivalent value is controlled so as to be the target value, and thus, the temperature of the high temperature portion is managed to be less than or equal to a predetermined temperature by setting the flow rate of the cooling air to the target value of the flow rate corresponding to the temperature of the cooling air. In addition, in the control method, since it is not necessary to needlessly increase the cooling air supplied to the high temperature portion, the electric power generation efficiency of the gas turbine can be improved.

In the method for controlling a cooling system of a gas turbine, the target value setting function may determine a relationship among the target value, the temperature of the cooling air, and a gas turbine output equivalent value, and in the step of determining the target value, a target value corresponding to the detected temperature of the cooling air and the gas turbine output equivalent value obtained from the outside may be determined using the target value setting function.

If the gas turbine output equivalent value is increased, heat quantity that heats the high temperature portion is increased. Thus, in the control method, by determining the target value corresponding to the gas turbine output equivalent value, even when the gas turbine output equivalent value is increased and the heat quantity that heats the high temperature portion is increased, the temperature of the high temperature portion becomes less than or equal to a predetermined temperature.

In any one of the above method for controlling a cooling system of a gas turbine, including a step of: determining a preceding driving amount corresponding to the detected temperature of the cooling air using a driving amount setting function that indicates a relationship between the temperature of the cooling air and a driving amount of the cooling air flow regulator, wherein a drive command corresponding to a driving amount, in which the correction driving amount is added to the preceding driving amount determined by the step of determining the preceding driving amount, may be output in the step of outputting the drive command.

In this case, the driving amount setting function may determine a relationship among the temperature of the cooling air, a gas turbine output equivalent value, and a driving amount of the cooling air flow regulator, and in the step of determining the preceding driving amount, the preceding driving amount corresponding to the detected temperature of the cooling air and the gas turbine output equivalent value obtained from the outside may be determined using the driving amount setting function.

In the control method, since a preceding control is performed using the preceding driving amount, responsiveness of the change of the cooling air flow rate according to changes in various parameters cm be increased.

According to another aspect of the present invention, there is provided a control device of a cooling system of a gas turbine, the cooling system being provided with a cooler which cools compressed air extracted from an air compressor of a gas turbine to make cooling air, and a cooling air compressor that supplies the cooling air to a high temperature portion exposed to a combustion gas in the gas turbine, including: a target value part that determines a target value with respect to a flow rate equivalent value of the cooling air corresponding to a detected temperature of the cooling air, using a target value setting function that determines a relationship between the target value and a temperature of the cooling air; a correction driving amount calculation part that obtains a correction driving amount, which reduces a deviation of the detected flow rate equivalent value of the cooling air with respect to the target value, as a correction driving amount of a cooling air flow regulator that regulates a flow rate of the cooling air; and a drive command output part that outputs a drive command corresponding to the correction driving amount to the cooling air flow regulator.

Also in the control device, similar to the above-described control method, the target value of the flow rate equivalent value corresponding to the temperature of the cooling air supplied to the high temperature portion is determined, and the flow rate equivalent value is controlled to be the target value. Accordingly the flow rate of the cooling air can be set to the target value of the flow rate corresponding to the temperature of the cooling air, and the temperature of the high temperature portion can be managed to be less than or equal to a predetermined temperature. Moreover, the electric power generation efficiency of the gas turbine can be improved.

In the control device of a cooling system of a gas turbine, the target value setting function may determine a relationship among the target value, the temperature of the cooling air, and a gas turbine output equivalent value, and the target value setting part may determine a target value corresponding to the detected temperature of the cooling air and the gas turbine output equivalent value obtained from the outside, using the target value setting function.

In the control device, since the target value corresponding to the gas turbine output equivalent value is determined, even when the gas turbine output equivalent value is increased and heat quantity that heats the high temperature portion is increased, the temperature of the high temperature portion can be managed to be less than or equal to a predetermined temperature.

In any one of the above control device of a cooling system of a gas turbine, the target value setting function may be a function that indicates a relationship in which the target value is increased as the temperature of the cooling air is increased.

In any one of the above control device of a cooling system of a gas turbine, the control device may further include a preceding driving amount setting part that determines a preceding driving amount corresponding to the detected temperature of the cooling air, using a driving amount setting function that indicates a relationship between the temperature of the cooling air and a driving amount of the cooling air flow regulator, and the drive command output part may output a drive command corresponding to a driving amount in which the correction driving amount is added to the preceding driving amount determined by the preceding driving amount setting part.

In this case, the driving amount setting function may determine a relationship among the temperature of the cooling air, a gas turbine output equivalent value, and a diving amount of the cooling air flow regulator, and the preceding driving amount setting part may determine the preceding driving amount corresponding to the detected temperature of the cooling air and the gas turbine output equivalent value obtained from the outside, using the driving amount setting function.

In the control device, since a preceding control is performed using the preceding driving amount, responsiveness of the change of the cooling air flow rate according to changes in various parameters can be increased.

According to still another aspect of the present invention, there is provided a gas turbine plant including: any one of the above control device; the cooling system of a gas turbine that includes a thermometer which detects the temperature of the cooling air supplied to the high temperature portion, a flow rate equivalent value meter which detects the flow rate equivalent value of the cooling air, the cooler, the cooling air compressor, and the cooling air flow regulator; and the gas turbine.

Since the gas turbine plant also includes any one of the above control device, the flow rate of the cooling air can be set to the target value of the flow rate corresponding to the temperature of the cooling air, and the temperature of the high temperature portion can be managed to be less than or equal to a predetermined temperature. Moreover, the electric power generation efficiency of the gas turbine can be improved.

In the gas turbine plant, the cooler may include a heat exchanger that exchanges heat between the compressed air from the air compressor and a cooling medium, and a medium flow regulator that regulates a flow rate of the cooling medium, and the control device may include a drive command output part that outputs a drive command to the medium flow regulator so that the temperature of the cooling air supplied to the high temperature portion becomes a temperature target value which is a target value of the temperature of the cooling air.

In this case, the control device may include a temperature target value setting part that determines a temperature target value, which is a target value of the temperature of the cooling air supplied to the high temperature portion, corresponding to a gas turbine output equivalent value obtained from the outside, using a temperature target value setting function that indicates a relationship between the temperature target value and the gas turbine output equivalent value.

In the gas turbine plant, since the temperature of the cooling air supplied to the high temperature portion becomes approximately the temperature target value, the control of the cooling air flow rate can be stabilized.

In addition, the gas turbine plant in which the cooler includes the medium flow regulator, the heat exchanger of the cooler may be a radiator that exchanges heat between the compressed air and air as a cooling medium, and the medium flow regulator of the cooler may be a fan that can regulate a flow rate of the air supplied to the radiator.

In this case, the gas turbine plant may further include a fuel preheater that exchanges heat between the air supplied from the fan to the radiator and a fuel supplied to a combustor of the gas turbine and heats the fuel. In the gas turbine plant, the electric power generation efficiency of the gas turbine can be improved.

Moreover, in this case, the gas turbine plant may further include: an exhaust heat recovery boiler that generates steam by exchanging heat with the combustion gas exhausted from the gas turbine; a first fuel preheater that exchanges heat between the air supplied from the fan to the radiator and a fuel supplied to the combustor of the gas turbine and heats the fuel; and a second fuel preheater that exchanges heat between the fuel and the steam or heated water generated by the exhaust heat recovery boiler and heats the fuel. In the gas turbine plant, the electric power generation efficiency of the gas turbine can be increased.

In any one of the above gas turbine plant in which the cooler includes the medium flow regulator, the gas turbine plant may further include an exhaust heat recovery boiler that generates steam by exchanging heat with the combustion gas exhausted from the gas turbine, and the heat exchanger of the cooler is a boiler water preheater that exchanges heat between water supplied to the exhaust heat recovery boiler as the cooling medium and the compressed air, and the medium flow regulator of the cooler may be a water flow regulator that regulates a flow rate of the water supplied to the boiler water preheater.

In the gas turbine plant, the compressed air can be cooled, and the electric power generation efficiency of the gas turbine can be improved.

Effects of the Invention

In the present invention, a temperature of a high temperature portion of a gas turbine can be suppressed to be less than or equal to a predetermined value, and the electric power generation efficiency of the gas turbine can be improved.

BEST MODE FOR CARRYING OUT THE INVENTION

Hereinafter, an embodiment of a gas turbine plant of a gas turbine according to the present invention will be described in detail with reference to FIGS. 1 to 5.

Figure 1:
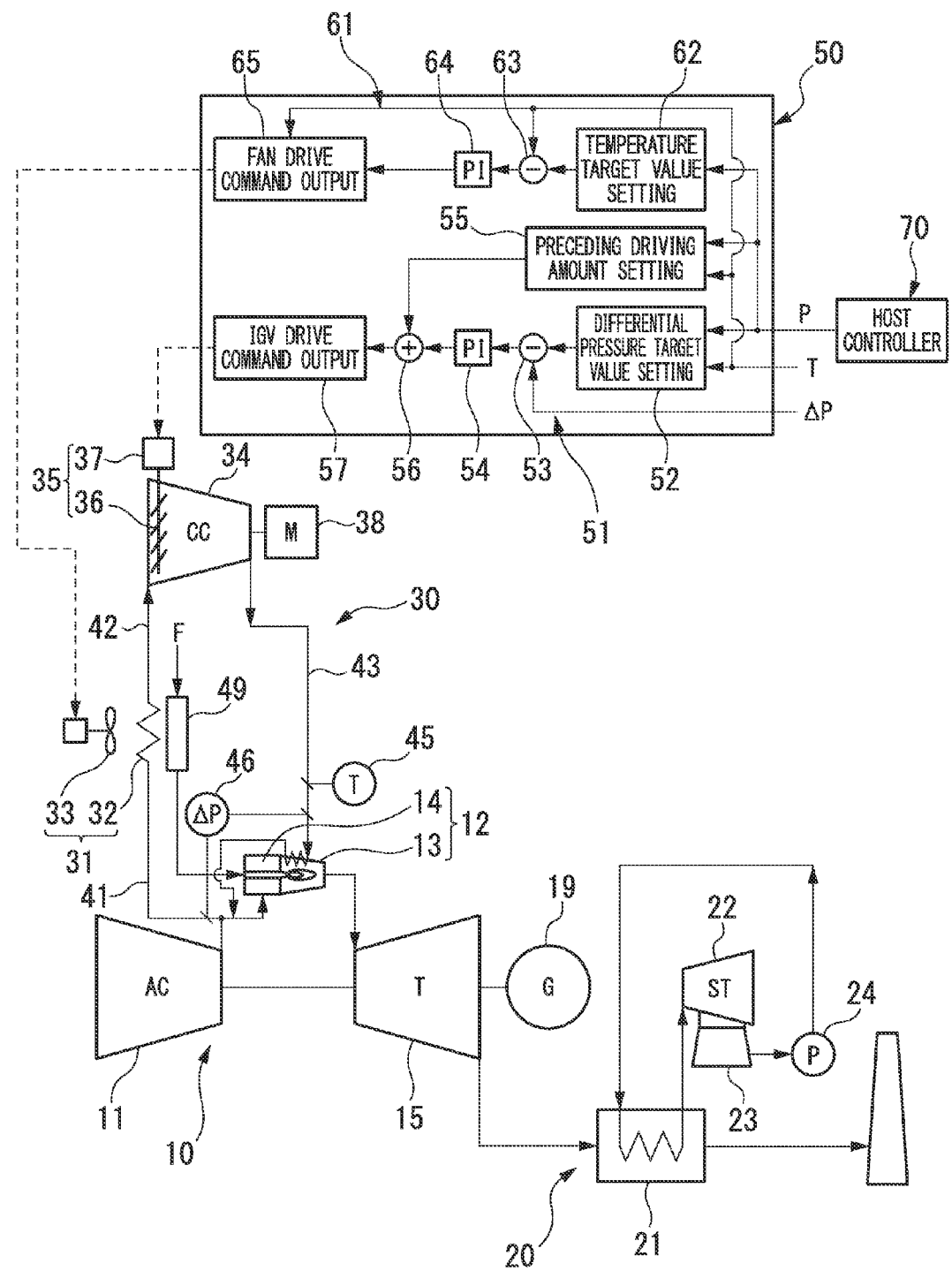
FIG. 1 is a system diagram of a gas turbine plant in an embodiment according to the present invention.

As shown in FIG. 1, the gas turbine plant of the present embodiment includes a gas turbine 10, an exhaust heat recovery device 20 that recovers heat of combustion gas exhausted from the gas turbine 10, a cooling system of a gas turbine (hereinafter, simply referred to as a cooling system) 30 that cools high temperature portions in the gas turbine 10, a control device 50 that controls the cooling system 30, and a host controller 70.

The gas turbine 10 includes an air compressor 11 that compresses outside air and generates compressed air, a plurality of combustors 12 that combusts fuel F from a fuel supply source in the compressed air and generates combustion gas, and a turbine 15 that is driven by the combustion gas. A generator 19 that generates electric power by rotation of a rotor is connected to the rotor of the turbine 15. The plurality of combustors 12 are fixed to a casing of the turbine 15 with equal intervals to each other in the circumferential direction around the rotor of the turbine 15. The combustor 12 includes a combustion liner 13 that supplies the combustion gas into a combustion gas passage of the turbine 15, and a fuel supplier 14 that injects the fuel and the compressed air into the combustion liner 13. In the gas turbine 10, the combustion liner 13 of the combustor 12 and a blade and a vane of the turbine 15 constitute the high temperature portions that are exposed to the combustion gas of high temperature. The cooling system 30 of the present embodiment supplies the cooling air to the combustion liner 13 of the combustor 12 of the high temperature portions in the gas turbine 10 and cools the combustion liner 13. For this purpose, a cooling air passage that passes between the outer circumferential surface and the inner circumferential surface of the combustion liner 13 is formed in the combustion liner 13. The cooling air passage is opened to each of the upstream side and the downstream side in a flow direction of the combustion gas in the outer circumferential side of the combustion liner 13. In the combustion liner 13, the opening of the downstream side in the flow direction of the combustion gas forms an inlet of the cooling air, and the opening of the upstream side in the flow direction of the combustion gas forms an outlet of the cooling air. After the cooling air, which flows into the cooling air passage from the opening of the downstream side in the flow direction of the combustion gas in the combustion liner 13, cools a wall surface of the combustion liner 13, the cooling air flows out from the opening of the upstream side in the flow direction of the combustion gas in the combustion liner 13 and is recovered to the combustor 12 as combustion air.

The exhaust heat recovery device 20 includes an exhaust heat recovery boiler 21 that generates steam by heat exchange between the combustion gas exhausted from the gas turbine 10 and water, a steam turbine 22 that is driven by the steam generated by the exhaust heat recovery boiler 21, a condenser 23 that condenses the steam, which has driven the steam turbine 22, to water, and a feed pump 24 that returns the water in the condenser 23 to the exhaust heat recovery boiler 21. For example, a generator that generates electric power by rotation of a rotor is connected to the rotor of the steam turbine 22.

The cooling system 30 includes a cooler 31 that cools the compressed air extracted from the air compressor 11 of the gas turbine 10 so as to make cooling air, and a cooling air compressor 34 that pressurizes the cooling air and supplies the cooling air to the combustion liner 13 of the combustor 12 as the pressurized cooling air. Moreover, hereinafter, the pressurized cooling air may also be simply referred to as cooling air.

The cooler 31 includes a radiator 32 in which the compressed air extracted from the air compressor 11 passes the inner portion, and a fan 33 that supplies air to the radiator 32. The fan 33 includes a motor with inverter, and can regulate the flow rate of air by changing the number of rotations of the motor with inverter. That is, the fan 33 is a medium flow regulator that can regulate the flow rate of air which is a cooling medium of the compressed air. A fuel preheater 49 is installed at a position adjacent to the radiator 32, and the fuel preheater 49 exchanges heat between the air heated by the heat exchange with the compressed air in the radiator 32 and the fuel F supplied to the combustor 12 and heats the fuel F.

A motor 38 is connected to the cooling air compressor 34, and the cooling air compressor 34 is driven by driving of the motor 38. A motor is used as a driving source of the cooling air compressor 34. However, the driving source of the cooling air compressor 34 may be any driving source, and for example, the cooling air compressor may be mechanically connected to the air compressor 11 of the gas turbine 10 or the rotor of the turbine 15 so that the air compressor 11 or the turbine 15 serves as the driving source. An IGV (inlet guide vane) 35 is provided in the inlet port of the cooling air compressor 34 as a cooling air flow regulator that regulates the flow rate of the sucked air. The IGV 35 includes a vane 36 that is disposed in the inlet port of the cooling air compressor 34 and a driver 37 that changes an angle of the vane 36.

In a compressed air line that supplies the compressed air from the air compressor 11 to the combustor 12, a compressed-air-for-cooling line 41 is branched at the middle of the compressed air line. The radiator 32 of the cooler 31 is connected to the compressed-air-for-cooling line 41. The radiator 32 and the inlet port of the cooling air compressor 34 are connected to each other by a cooling air line 42. A discharge port of the cooling air compressor 34 and the combustion liner 13 of the combustor 12 are connected to each other by a pressurized cooling air line 43. In addition, the cooling system 30 of the present embodiment includes a thermometer 45 that detects the temperature of the pressurized cooling air passing through the pressurized cooling air line 43, and a differential pressure gauge 46 that detects a differential pressure between the pressure of the compressed air in the compressed-air-for-cooling line 41 and the pressure of the pressurized cooling air in the pressurized cooling air line 43, that is, a differential pressure $\Delta P$ between the discharge pressure of the air compressor 11 and the inlet pressure of the combustor 12 of the pressurized cooling air.

The control device 50 includes an IGV control system 51 that controls a vane opening degree of the IGV 35 which is a cooling air flow regulator, a fan control system 61 that controls the number of rotations of the fan 33 which is a medium flow regulator in the cooler 31, and a compressor control system (not shown) that activates the motor 38, or the like, which is a driving source of the cooling air compressor 34. The IGV control system 51 outputs a drive command, which indicates a driving amount (IGV opening degree) of the driver 37, to the driver 37 of the IGV 35. The IGV control system 51 includes a differential pressure target value setting part 52 that determines a target value of the differential pressure $\Delta P$ between the pressure of the compressed air in the compressed-air-for-cooling line 41 and the pressure of the pressurized cooling air in the pressurized cooling air line 43, a subtracter 53 that obtains a deviation between the differential pressure $\Delta P$ detected by the differential pressure gauge 46 and the differential pressure target value, a PI controller 54 that obtains a correction driving amount for a proportional integral operation corresponding to the deviation, a preceding driving amount setting part 55 that determines a preceding driving amount (IGV opening degree), an adder 56 that outputs a driving amount in which a correction driving amount is added to the preceding driving amount, and an IGV drive command output part 57 that outputs the drive command corresponding to the driving amount from the adder 56 to the driver 37 of the IGV 35. Moreover, in the IGV control system 51, a correction driving amount calculation pair is configured to include the subtracter 53 and the PI controller 54.

Figure 2:
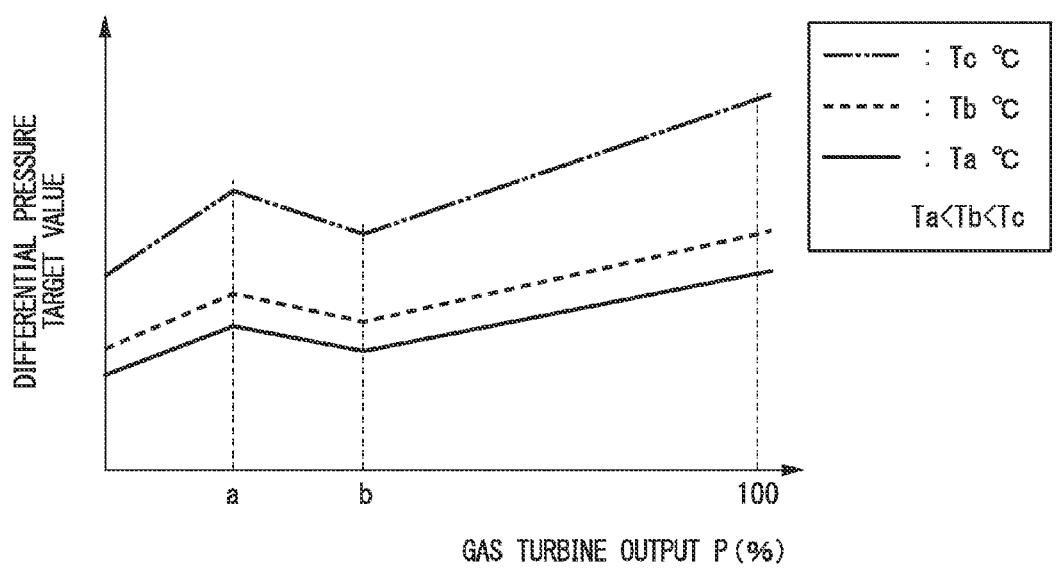
FIG. 2 is an explanatory diagram showing a differential pressure target value setting function in the embodiment according to the present invention.

As shown in FIG. 2, the differential pressure target value setting part 52 includes a differential pressure target value setting function that indicates a relationship among the differential pressure target value, a gas turbine output P, and a temperature T of the pressurized cooling air detected by the thermometer 45. The differential pressure target value setting function is a function in which the differential pressure target value is increased as the temperature T ($Ta<Tb<Tc$) of the pressurized cooling air is increased. Moreover, when the gas turbine output P is equal to or more than a medium output (b %) which is, for example, approximately 50%, the differential pressure target value setting function is a function in which the differential pressure target value is increased as the gas turbine output P is increased. The differential pressure target value setting part 52 determines the differential pressure target value corresponding to the gas turbine output P obtained from the host controller 70 and the temperature T of the pressurized cooling air detected by the thermometer 45 using the differential pressure target value setting function.

In addition, for example, the value of the gas turbine output P is sent from the host controller 70. For example, the host controller 70 handles the value of electric power, which is detected by a wattmeter or the like that detects the generated electric power of the generator 19 connected to the gas turbine 10, as the value of the gas turbine output P.

Figure 3:
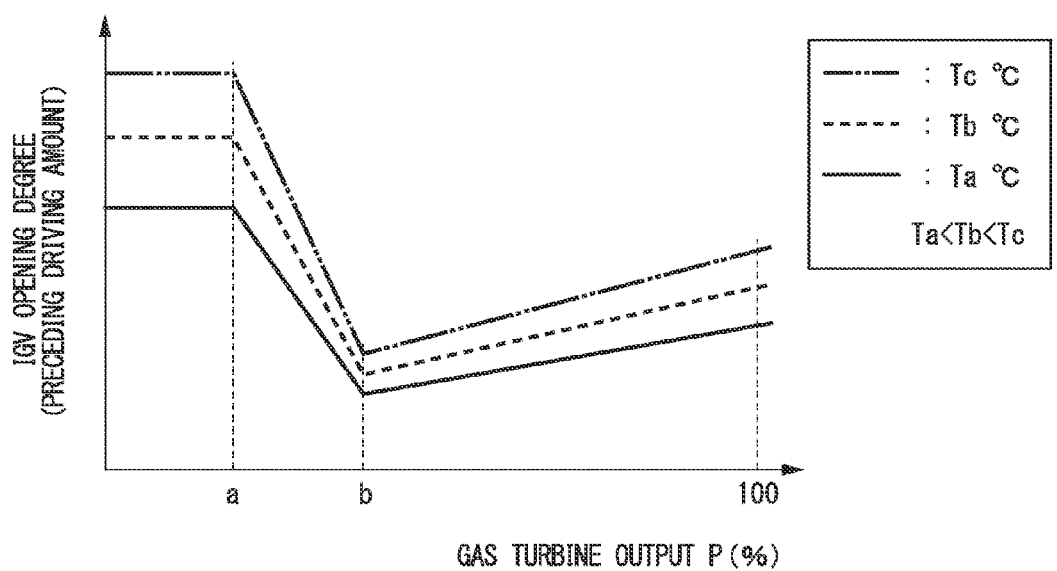
FIG. 3 is an explanatory diagram showing a preceding driving amount setting function in the embodiment according to the present invention.

As shown in FIG. 3, the preceding driving amount setting part 55 includes a preceding driving amount setting function that indicates a relationship among the preceding driving amount (IGV opening degree), the gas turbine output P, and the temperature T of the pressurized cooling air detected by the thermometer 45. The preceding driving amount setting function is a function in which the preceding diving amount is increased as the temperature T ($Ta<Tb<Tc$) of the pressurized cooling air is increased. The preceding driving amount setting function is a function in which the preceding driving amount indicates a maximum and constant value at the pressurized air temperature in a case where the gas turbine output P is from 0% to a predetermined low output (a %) when the temperature of the pressurized cooling air is constant. Moreover, the preceding driving amount setting function is a function in which the preceding driving amount is decreased as the gas turbine output P is increased in a case where the gas turbine output P is from the low output (a %)

to the above-described medium output (b %) when the temperature of the pressurized cooling air is constant. In addition, the preceding driving amount setting function is a function in which the preceding driving amount is increased as the gas turbine output P is increased in a case where the gas turbine output P is equal to or more than the medium output (b %) when the temperature of the pressurized cooling air is constant. The preceding driving amount setting part 55 determines the preceding driving amount corresponding to the gas turbine output P obtained from the host controller 70 and the temperature T of the pressurized cooling air detected by the thermometer 45 using the preceding driving amount setting function.

Figure 4:
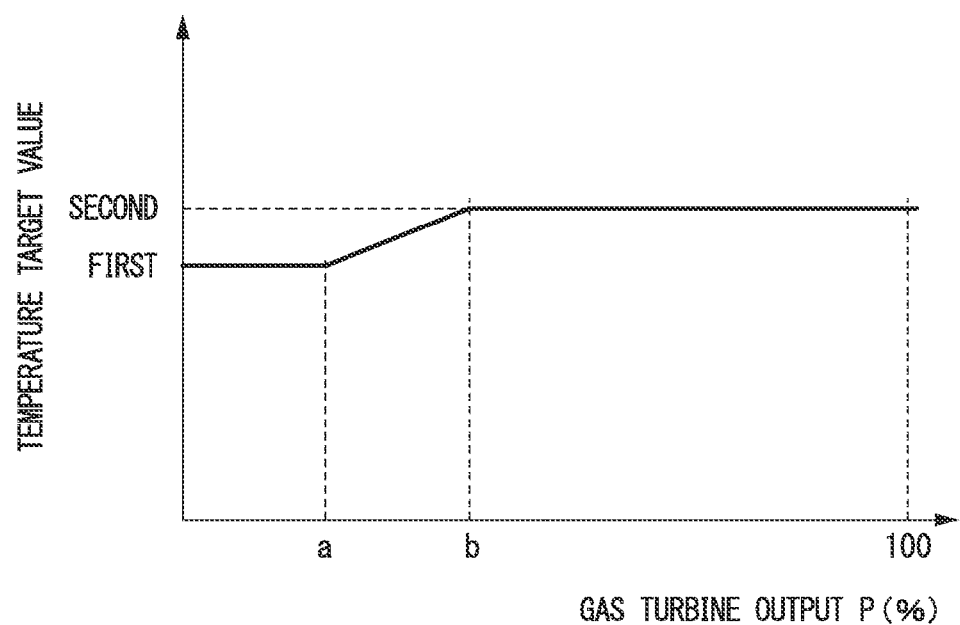
FIG. 4 is an explanatory diagram showing a temperature target value setting function in the embodiment according to the present invention.

The fan control system 61 outputs a drive command, which indicates the driving amount (number of rotations) of the fan 33, to the fan 33. The fan control system 61 includes a temperature target value setting part 62 that determines a target value of the temperature T of the pressurized cooling air detected by the thermometer 45, a subtracter 63 that obtains a deviation between the temperature T of the pressurized cooling air detected by the thermometer 45 and the temperature target value, a PI controller 64 that obtains a correction driving amount for a proportional integral operation corresponding to the deviation, and a fan drive command output part 65 that outputs the drive command corresponding to the correction driving amount to the fan 33. As shown in FIG. 4, the temperature target value setting part 62 includes a temperature target value setting function that indicates a relationship between the temperature target value and the temperature T of the pressurized cooling air detected by the thermometer 45. The temperature target value setting function is a function in which the temperature target value indicates a first constant temperature target value when the gas turbine output P is from 0% to the above-described low output (a %) and the temperature target value indicates a second temperature target value which is constant and higher than the first temperature target value when the gas turbine output P is equal to or more than the above-described medium output (b %). Moreover, the temperature target value setting function is a function in which the temperature target value is increased as the gas turbine output P is increased when the gas turbine output P is from the low output (a %) to the medium output (b %). The temperature target value setting part 62 determines the temperature target value corresponding to the temperature T of the pressurized cooling air detected by the thermometer 45 using the temperature target value setting function.

In addition, the differential pressure target value setting function, the preceding driving amount setting function, and the temperature target value setting function described above may be a type in which mutual relationships of each parameter are represented by an equation or be a table type in which plural values for each of the plural parameters are associated with one another.

Figure 5:
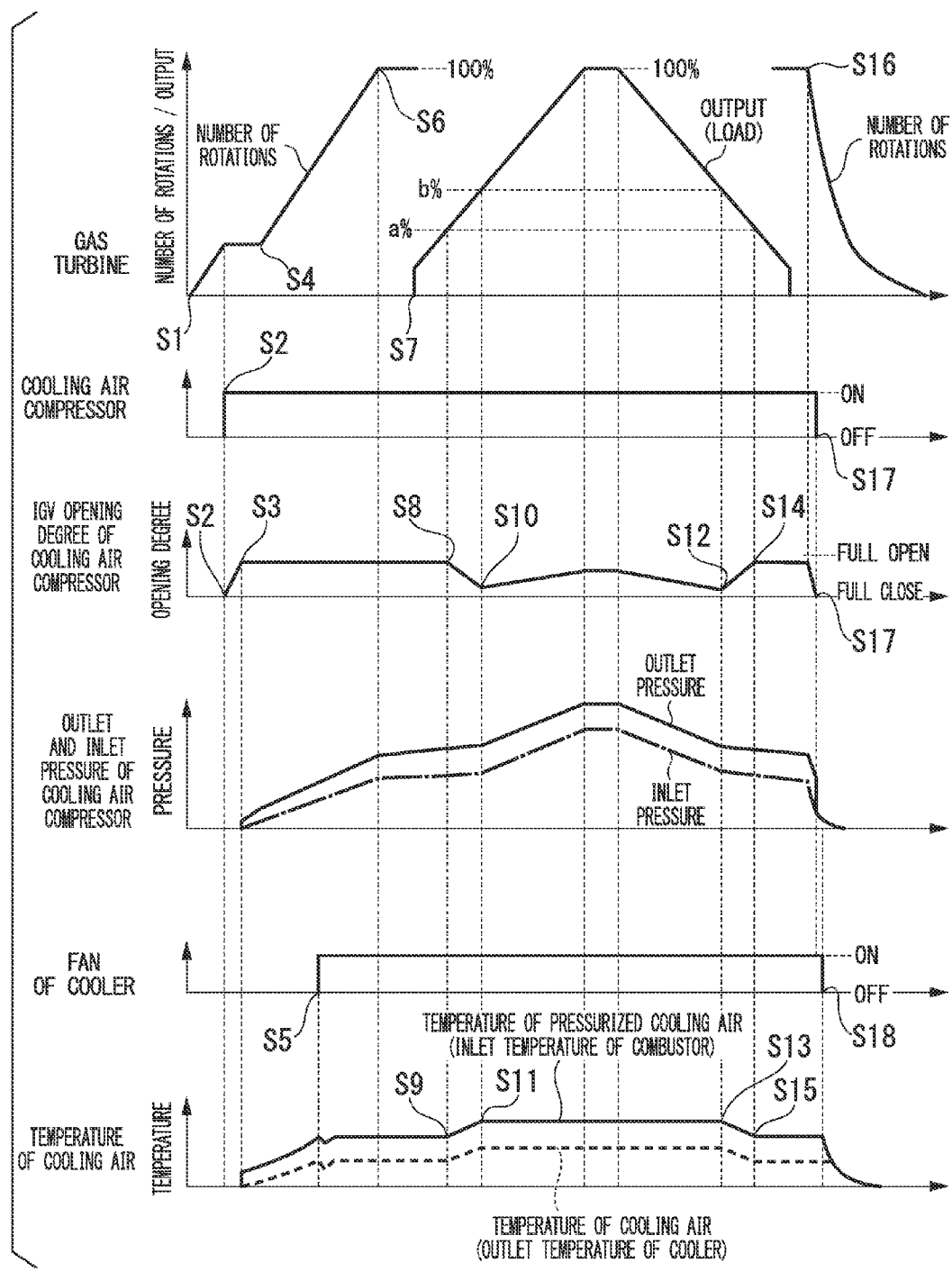
FIG. 5 is a timing chart showing an operation and the like of each portion of a gas turbine plant in the embodiment according to the present invention.

Next, operations of the cooling system 30 and the control device 50 described above will be described according to a timing chart shown in FIG. 5.

The rotor of the turbine 15 and the rotor of the air compressor 11 start to be rotated by a starter (S1), and the number of rotations is gradually increased. According to the increase of the number of rotations of the rotor of the air compressor 11, the pressure of the compressed air that is discharged from the air compressor 11 is gradually increased, and the temperature of the compressed air is also gradually increased. When the rotor of the turbine 15 and the rotor of the air compressor 11 reach a predetermined low number of rotations, the cooling air compressor 34 is activated by a command from a compressor control system (not shown) of the control device 50, and a vane 36 of the IGV 35 start to open by a drive command from the IGV control system 51 of the control device 50 (S2). Then, the opening degree of the vane 36 of the IGV 35 (hereinafter; simply referred to as an IGV opening degree) becomes a full open state (100%) or a maximum opening degree of the opening degrees corresponding to the temperature T detected by the thermometer 45 at that time (S3).

When the cooling air compressor 34 is activated and the vane 36 of the IGV 35 starts to open (S2), the compressed air from the air compressor 11 is supplied to the combustion liner 13 of the combustor 12 through the compressed-air-for-cooling line 41, the cooling air line 42, and the pressurized cooling air line 43. At this time, the fan 33 of the cooler 31 is not activated yet. In this step, a cooler outlet temperature of the air, that is, the temperature of the air in the cooling air line 42 is substantially the same as the temperature of the compressed air immediately after the compressed air is discharged from the air compressor 11. Moreover, an inlet temperature of the combustor 12 of the air, that is, the temperature in the pressurized cooling air line 43 detected by the thermometer 45 is higher than the cooler outlet temperature due to pressurization of the cooling air compressor 34.

Thereafter, fuel is supplied to the combustor 12 of the gas turbine 10, and the fuel is ignited in the combustion liner 13 of the combustor 12 (S4). An amount of the fuel supply to the gas turbine is gradually increased from this point up to a load operation of the gas turbine 10.

When the inlet temperature in the combustor 12 of the air, that is, the temperature T of the air detected by the thermometer 45 becomes a fan activation temperature, a drive command, which indicates the activation of the fan 33 is output from the fan drive command output part 65 of the control device 50, and the fan 33 is activated (S5). When the fan 33 is activated, the compressed air passing through the inner portion of the radiator 32 of the cooler 31 performs heat exchange with the with the air from the fan 33, and the compressed air is cooled. The compressed air flows in the cooling air line 42 as cooling air. As a result, the temperature of the cooling air in the cooling air line 42, that is, the cooler outlet temperature, and the temperature of the pressurized cooling air in the pressurized cooling air line 43, that is, the inlet temperature in the combustor of the pressurized cooling air all are decreased temporarily. However, since the temperature of the compressed air discharged from the air compressor 11 is increased according to the increase of the number of rotations of the rotor of the air compressor 11, the cooler outlet temperature of the cooling air and the combustor inlet temperature of the pressurized cooling air start to be increased again.

When the temperature T of the air detected by the thermometer 45 becomes the fan activation temperature, as described above, the fan control system 61 of the control device 50 causes the fan 33 to be activated and also starts the control of the number of rotations of the fan 33 (S5). 0% of the gas turbine output P is input to the temperature target value setting part 62 of the fan control system 61 from the host controller 70. The temperature target value setting part 62 outputs a first temperature target value, which is the temperature target value of the pressurized cooling air corresponding to 0% of the gas turbine output P, using the temperature target value setting function (refer to FIG. 4). The subtracter 63 of the fan control system 61 obtains the deviation between the temperature T of the pressurized cooling air detected by the thermometer 45 and the first temperature target value, and outputs the deviation to the PI controller 64 of the fan control system 61. The PI controller 64 obtains the correction driving amount for the proportional integral operation corresponding to the deviation and outputs the correction driving amount to the fan drive command output part 65. The fan drive command output part 65 outputs the drive command corresponding to the correction driving amount to the fan 33. As a result, the temperature of the pressurized cooling air detected by the thermometer 45 becomes substantially the first temperature target value.

When a predetermined time elapses after the number of rotations of the rotor of the turbine 15 and the number of rotations of the rotor of the air compressor 11 reach 100% (S6), the generator 19 is synchronized to an external electric power system, and the electric power system load, that is, the gas turbine output P starts to increase (S7).

When the gas turbine output P becomes the above-described low output (a %), a control of vane opening degree of the IGV 35 is started by the IGV control system 51 of the control device 50 (S8). The gas turbine output P from the host controller 70 and the temperature T of the pressurized cooling air detected by the thermometer 45 are input to the preceding driving amount setting part 55 of the IGV control system 51. The preceding driving amount setting part 55 determines the preceding driving amount corresponding to the gas turbine output P and the temperature T of the pressurized cooling air using the preceding driving amount setting function (refer to FIG. 3), and outputs the determined preceding driving amount to the adder 56. In parallel with the above-described operation, the gas turbine output P from the host controller 70 and the temperature T of the pressurized cooling air detected by the thermometer 45 are also input to the differential pressure target value setting part 52 of the IGV control system 51. The differential pressure target value setting part 52 determines the differential pressure target value corresponding to the gas turbine output P and the temperature T of the pressurized cooling air using the differential pressure target value setting function (refer to FIG. 2), and outputs the determined differential pressure target value. The subtracter 53 of the IGV control system 51 obtains the deviation between the differential pressure target value and the differential pressure $\Delta P$ detected by the differential pressure gauge 46, and outputs the deviation to the PI controller 54 of the IGV control system 51. The PI controller 54 obtains the correction driving amount for the proportional integral operation corresponding to the deviation, and outputs the obtained correction driving amount to the adder 56. The adder 56 adds the preceding driving amount output from the preceding driving amount setting part 55 and the correction driving amount output from the PI controller 54, and outputs the driving amount obtained by this adding. The IGV drive command output part 57 outputs the drive command corresponding to the diving amount output from the adder 56 to the driver 37 of the IGV 35. As a result, the IGV opening degree becomes an opening degree matching the driving amount indicated by the drive command.

That is, in the present embodiment, the preceding driving amount of the IGV 35 is determined, a feed-forward control is performed on the flow rate of the pressurized cooling air, and a feedback control of the flow rate of the pressurized cooling air is performed based on the differential pressure $\Delta P$ having a correlation with the flow rate of the pressurized cooling air.

Moreover, as described above, the preceding driving amount setting function (refer to FIG. 3) is a function in which the preceding driving amount is decreased as the gas turbine output P is increased when the gas turbine output P is from the low output (a %) to the medium output (b %). Thereby, when the gas turbine output P is from the low output (a %) to the medium output (b %), the preceding driving amount determined by the preceding driving amount setting function works, and the IGV opening degree is decreased as the gas turbine output P is increased.

Moreover, as described above, the temperature target value setting function (refer to FIG. 4), which is included in the fan control system 61, is a function in which the temperature target value is increased as the gas turbine output P is increased when the gas turbine output P is from the low output (a %) to the medium output (b %). Thereby, when the gas turbine output P becomes the low output (a %), the temperature of the cooling air aid the temperature of the pressurized cooling air are increased as the gas turbine output P is increased from the low output (a %) to the medium output (b %) (S9).

As described above, the preceding driving amount setting function (refer to FIG. 3), which is included in the IGV control system 51, is a function in which the preceding driving amount is increased as the gas turbine output P is increased when the gas turbine output P is equal to or more than the medium output (b %). In addition, the differential pressure target value setting function (FIG. 2), which is included in the IGV control system 51, is a function in which the differential pressure target value is increased as the gas turbine output P is increased when the gas turbine output P is equal to or more than the medium output (b %). That is, when the gas turbine output P is equal to or more than the medium output (b %), the preceding driving amount and the differential pressure target value are increased as the gas turbine output P is increased. Thereby, if the gas turbine output P becomes equal to or more to or more than the medium output (b %), the IGV opening degree is increased as the gas turbine output P is increased. In other words, when the gas turbine output P is equal to or more than the medium output (b %), the IGV opening degree is decreased as the gas turbine output P is decreased (S10).

Moreover, the temperature target value setting function (refer to FIG. 4), which is included in the fan control system 61, is a function that indicates the second temperature target value larger than the first constant temperature target value when the gas turbine output P is equal to or more than the medium output (b %). Therefore, if the gas turbine output P becomes equal to or more than the medium output (b %), the temperature of the pressurized cooling air becomes substantially the second temperature target value (S11).

When the amount of the fuel supply to the gas turbine 10 is decreased after the gas turbine output P exceeds the medium output (b %), and the gas turbine output becomes less than or equal to the medium output (b %) again, according to the control by the IGV control system 51, the opening degree of the vane 36 of the IGV 35 is increased as the gas turbine output P is decreased (S12), and according to the control of the fan control system 61, the temperature of the cooling air and the temperature of the pressurized cooling air are decreased as the gas turbine output P is decreased (S13).

When the gas turbine output P is further decreased and becomes less than or equal to the low output (a %), according to the control by the IGV control system 51, the IGV opening degree becomes 100% again or becomes a maximum opening degree of the opening degrees corresponding to the temperature T detected by the thermometer 45 at that time (S14), and according to the control by the fan control system 61, the temperature of the pressurized cooling air becomes substantially the first temperature target value again (S15).

Moreover, when a predetermined time elapses after the fuel supply to the gas turbine 10 stops (S16), according to the control by the IGV control system 51, the IGV opening degree becomes 0%, that is, a full closed state (S17), and the cooling air compressor 34 stops, and the fan 33 stops (S18) according to the control by the fan control system 61.

As described above, the differential pressure $\Delta P$ between the pressure of the compressed air in the compressed-air-for-cooling line 41 and the pressure of the pressurized cooling air in the pressurized cooling air line 43, that is, the differential pressure $\Delta P$ between the discharge pressure of the air compressor 11 and the pressure of the pressurized cooling air that is supplied to the combustion liner 13 of the combustor 12 has a correlation with the flow rate of the cooling air that is supplied to the combustion liner 13 of the combustor 12. Thereby, if the IGV opening degree is regulated and the differential pressure $\Delta P$ is controlled to be the differential pressure target value, the flow rate of the cooling air that is supplied to the combustion liner 13 of the combustor 12 also becomes a predetermined flow rate matching the differential pressure target value. However, even though the flow rate of the cooling air that is supplied to the combustion liner 13 of the combustor 12 can be controlled, if the cooling air cannot be controlled to the flow rate matching the temperature of the cooling air, the combustion liner 13 cannot be managed to be less than or equal to a predetermined temperature.

Therefore, in the present embodiment, since the differential pressure target value corresponding to the temperature of the pressurized cooling air supplied to the combustion liner 13 is determined and the differential pressure $\Delta P$ is controlled so as to be the target differential pressure $\Delta P$, the flow rate of the pressurized cooling air is set to the target value corresponding to the temperature of the pressurized cooling air, and thus, the temperature of the combustion liner 13 is managed so as to be less than or equal to the temperature in which the combustion liner 13 is not damaged. In addition, in the present embodiment, since it is not necessary to increase the cooling air supplied to the combustion liner 13 needlessly the electric power generation efficiency of the gas turbine 10 can be improved.

When the gas turbine 10 reaches the medium output (b %) or more, the amount of the fuel supply to the gas turbine 10 is increased, mid when the gas turbine output P is increased, heat quantity which heats the combustion liner 13 is increased. Therefore, in the present embodiment, according to the increase of the gas turbine output P, the differential pressure target value is increased and the preceding driving amount of the IGV 35 is increased, and thus, the flow rate of the pressurized cooling air supplied to the combustion liner 13 is increased, and an increase in the temperature of the combustion liner 13 is suppressed.

Moreover, in the present embodiment, based on the differential pressure $\Delta P$ having a correlation with the flow rate of the pressurized cooling air, a feedback control of the flow rate of the pressurized cooling air is performed, the preceding driving amount of the IGV 35 is determined, and a feed-forward control is performed on the flow rate of the pressurized cooling air. Therefore, the responsiveness of the flow rate change of the pressurized cooling air according to changes in various parameters such as the temperature of the pressurized cooling air or the gas turbine output P can be increased.

Moreover, in the present embodiment, since the fuel supplied to the combustor 12 is preheated by the fuel preheater 49 using the heat of air which is blown from the fan 33 of the cooler 31 and is heated by heat exchange with the compressed air, the electric power generation efficiency of the gas turbine 10 can be further improved.

Now, in a step of starting or stopping of the gas turbine 10, the pressure of the pressurized cooling air is lower than the pressure during the load operation. Therefore, in the present embodiment, in order to secure the flow rate and the temperature of the pressurized cooling air required for the cooling of the combustion liner 13 in the step of starting or stopping, by making the IGV opening degree be the full open state (100%) or the maximum opening degree of the opening degrees corresponding to the temperature T detected by the thermometer 45 at that time and by decreasing the temperature of the pressurized cooling air, the flow rate of the pressurized cooling air having low temperature is increased.

Moreover, in the step of starting or stopping, even when the temperature of the pressurized cooling air is not decreased, if the IGV opening degree is set to the full open state (100%) or the maximum opening degree of the opening degrees corresponding to the temperature T detected by the thermometer 45 at that time, the combustion liner 13 of the combustor 12 can be cooled to be less than or equal to a predetermined temperature. However, if the temperature of the pressurized cooling air is not decreased, since it is necessary to increase the flow rate of the pressurized cooling air, a required suction air amount of the cooling air compressor 34 should be increased, the size of the cooling air compressor 34 is increased, and the installation costs are increased. Therefore, in the present embodiment, in the step of starting or stopping, since the temperature of the pressurized cooling air is decreased, the required suction air amount of the cooling air compressor 34 is decreased, and increases in the size and the costs of the cooling air compressor 34 are suppressed.

First Modification

Figure 6:
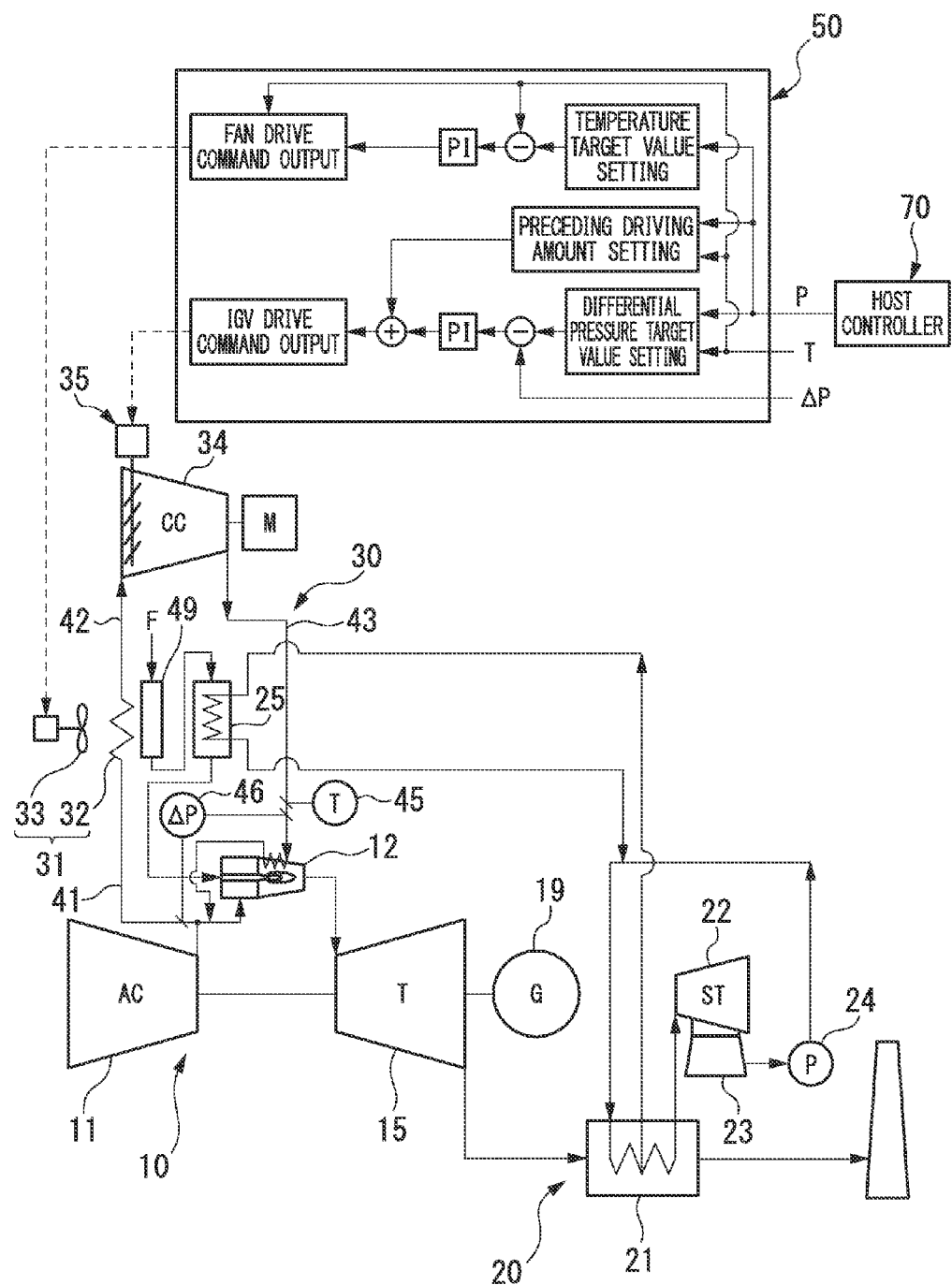
FIG. 6 is a system diagram of a gas turbine plant in a first modification of the embodiment according to the present invention.

Next, a first modification of the above-described embodiment related to the gas turbine plant will be described referring to FIG. 6.

In the embodiment described above, the fuel preheater 49 that heats the fuel F is installed at the position adjacent to the radiator 32 of the cooler 31. In the present modification, a fuel preheater (second fuel preheater) 25 is further provided, which exchanges heat between the fuel F heated by the fuel preheater (first fuel preheater) 49 and the steam or the heated water generated by the exhaust heat recovery boiler 21 and further heats the fuel F.

As described above, in the present modification, the fuel F is heated using heat of the air which is blown from the fan 33 of the cooler 31 and is heated by heat exchange with the compressed air, and the fuel F is further heated using the heat of the steam or the heated water generated by the exhaust heat recovery boiler 21. Accordingly, the electric power generation efficiency of the gas turbine can be further improved.

Second Modification

Figure 7:
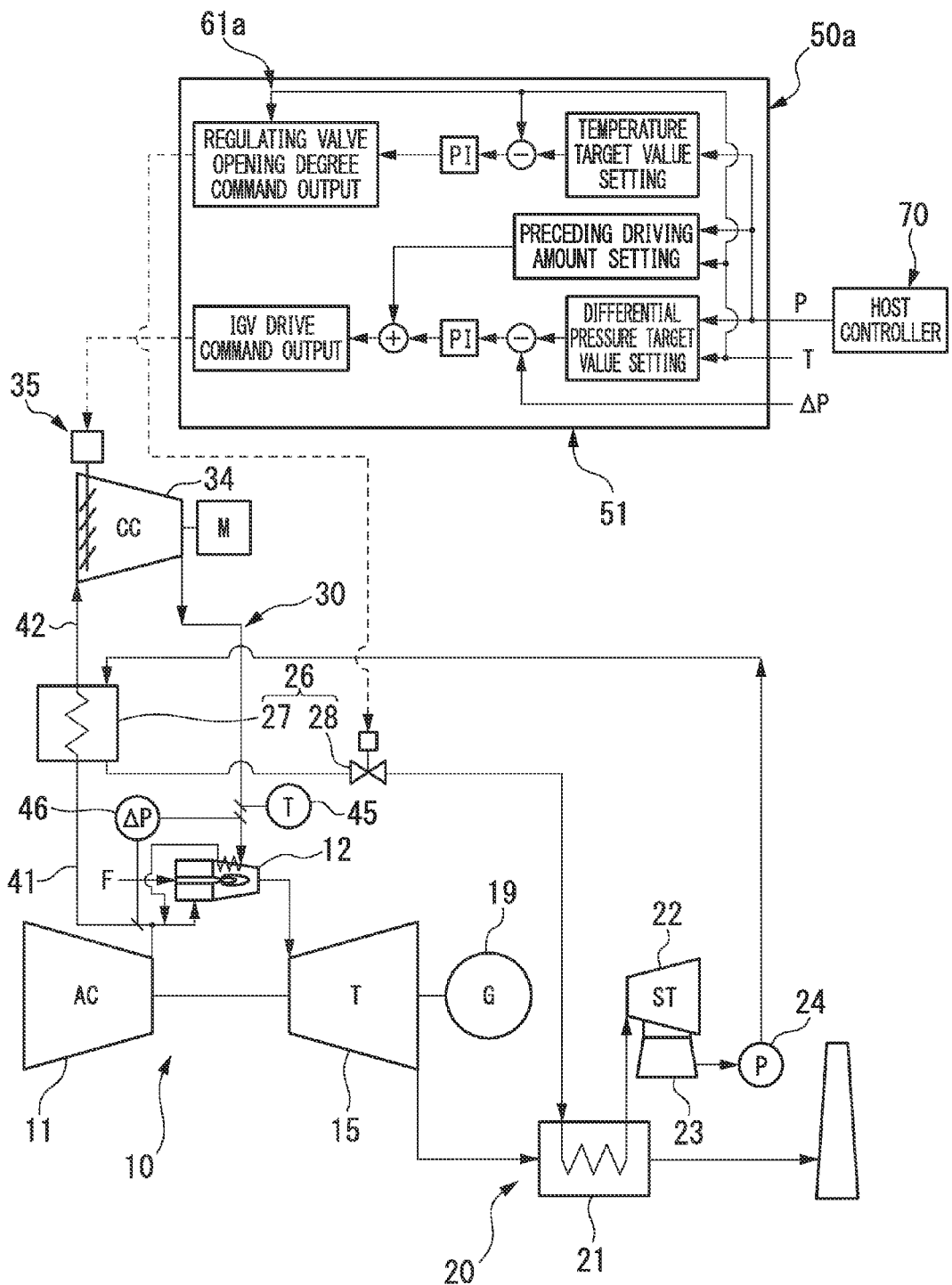
FIG. 7 is a system diagram of a gas turbine plant in a second modification of the embodiment according to the present invention.

Next, a second modification of the above-described embodiment of the gas turbine plant will be described referring to FIG. 7.

In the embodiment described above, the heat exchanger of the cooler 31 is the radiator 32 and the medium flow regulator of the cooler 31 is the fan 33. In the present modification, a boiler water preheater 27, which exchanges heat between boiler water supplied to the exhaust heat recovery boiler 21 and the compressed air, is used instead of the radiator 32 as the heat exchanger of the cooler 26, and a water flow regulating valve (water flow regulator) 28 which regulates the flow rate of the boiler water supplied to the boiler water preheater 27 is used instead of the fan 33 as the medium flow regulator of the cooler 26. Thereby, in the control device 50a of the present modification, a water flow regulating valve control system 61a that outputs opening degree commands to the water flow regulating valve is provided instead of the fan control system 61.

As described above, in the present modification, since the boiler water supplied to the exhaust heat recovery boiler 21 performs heat exchange with the compressed air, the compressed air can be cooled and the boiler water can be preheated.

Other Modifications

In the embodiment described above, the differential pressure gauge 46 is provided, and the flow rate of the cooling air supplied to the combustion liner 13 of the combustor 12 is controlled based on the differential pressure ΔP detected by the differential pressure gauge 46. However, instead of the differential pressure gauge 46, a flowmeter that detects the flow rate of the cooling air supplied to the combustor 12 may be provided at any position in the line through which the compressed air extracted from the air compressor 11 is supplied to the combustion liner 13 of the combustor 12, and based on the flow rate that is detected by the flowmeter, the flow rate of the cooling air supplied to the combustion liner 13 of the combustor 12 may be controlled. In this case, the differential pressure target value setting part 52 of the IGV control system 51 becomes the flow rate target value setting part. In addition, the flow rate target value setting part determines the flow rate target value corresponding to the gas turbine output P and the temperature T of the pressurized cooling air using a flow rate target value setting function that indicates a relationship among the flow rate target value, the gas turbine output P, and the temperature T of the pressurized cooling air detected by the thermometer 45. Moreover, the subtracter 53 of the IGV control system 51 obtains the deviation between the flow rate target value and the flow rate detected by the flowmeter.

As described above, in the present invention, a flow rate equivalent value of the air supplied to the combustion liner 13 of the combustor 12 may be the flow rate of the cooling air, and may be the differential pressure ΔP or the like having a correlation with the flow rate of the air, for example. In addition, the flow rate of the cooling air may be a volumetric flow rate or a mass flow rate.

Moreover, in the embodiment described above, the differential pressure gauge 46 is installed in order to detect the differential pressure ΔP between the discharge pressure of the air compressor 11 and the inlet pressure to the combustor 12 of the pressurized cooling air. However, the discharge pressure of the air compressor 11 and the inlet pressure to the combustor 12 of the pressurized cooling air may be detected by each pressure gauge that is provided independently, and the pressure difference may be calculated by the control device 50 or 50a and the calculated pressure difference may be the differential pressure ΔP.

Moreover, in the above-described embodiment, as the gas turbine output equivalent value, the value of the electric power is used, which is detected by the wattmeter or the like that detects the generated electric power of the generator 19 connected to the gas turbine 10. However, in the present invention, the gas turbine output equivalent value may be a value of any parameters if the parameters have a correlation with the gas turbine output P. For example, the gas turbine output equivalent value may be the value of the fuel flow rate supplied to the gas turbine 10, the temperature of the combustion gas inlet portion of the turbine 10 that is assumed from the operation conditions of the gas turbine 10 or the like, or a value in which the temperature is made so as to be dimensionless.

Moreover, in the embodiments described above, the thermometer 45 is provided in the pressurized cooling air line 43. However, the thermometer 45 may be provided in the cooling air line 42 which is in between the coolers 26 and 31 and the cooling air compressor 34.

In addition, in the embodiments described above, the IGV 35 is used as the cooling air regulator. However, the cooling air regulator may be any device if it can regulate the flow rate of the cooling air supplied to the high temperature portion of the gas turbine 10. Moreover, in the embodiments described above, the IGV 35 is provided in the cooling air compressor 34 as the cooling air regulator. However, the cooling air regulator may be provided on the upstream side or the downstream side of the cooling air compressor 34.

Moreover, in the embodiments described above, the cooling air is supplied to the combustion liner 13 of the combustor 12. However, the cooling air may be supplied to any place if it is a high temperature portion which is exposed to the combustion gas in the gas turbine 10, and the cooling air may be supplied to a blade or a vane of the turbine 15, or the like, for example.

INDUSTRIAL APPLICABILITY

In the present invention, a temperature of a high temperature portion of a gas turbine can be suppressed to be less than or equal to a predetermined value, and the electric power generation efficiency of the gas turbine can be improved.

DESCRIPTION OF SYMBOLS

10: gas turbine
11: air compressor
12: combustor
13: combustion liner
15: turbine
19: generator
20: exhaust heat recovery device
21: exhaust heat recovery boiler
25: fuel preheater (second fuel preheater)
27: boiler water preheater
28: water flow regulating valve
30: cooling system of a gas turbine
26, 31: cooler
32: radiator
33: fan
34: cooling air compressor
45: thermometer
46: differential pressure gauge
49: fuel preheater (first fuel preheater)
50: control device
51: IGV control system
52: differential pressure target value setting part
55: preceding driving amount setting part
57: IGV drive command output part
61: fan control system
62: temperature target value setting part
65: fan drive command output part
70: host controller

What is claimed is:

1. A method for controlling a cooling system of a gas turbine, the cooling system being provided with a cooler which cools compressed air extracted from an air compressor of the gas turbine to make cooling air, and a cooling air compressor that supplies the cooling air to a high temperature portion exposed to a combustion gas in the gas turbine, the method comprising the steps of:
   determining a differential pressure target value with respect to a flow rate equivalent value of the cooling air supplied to the high temperature portion corresponding to a detected temperature of the cooling air supplied to the high temperature portion by using a differential pressure target value setting function that determines a relationship between the differential pressure target value and the temperature of the cooling air, the differential pressure target value being a differential pressure between a first pressure at a first position where the compressed air is extracted from the air compressor of the gas turbine and a second pressure at a second position where the cooling air is supplied to the high temperature portion;
   determining a preceding driving amount of a cooling air flow regulator using the detected temperature of the cooling air and a preceding driving amount setting function that indicates a relationship between the temperature of the cooling air and the preceding driving amount of the cooling air flow regulator that regulates a flow rate of the cooling air, the preceding driving amount which is used to perform a feed-forward control of the flow rate of the cooling air;
   calculating a correction driving amount which reduces a deviation of a detected flow rate equivalent value of the cooling air with respect to the differential pressure target value, as a correction driving amount of the cooling air flow regulator; and
   outputting a drive command by which the cooling air flow regulator is driven, the drive command corresponding to the preceding driving amount and the correction driving amount to the cooling air flow regulator.

2. The method for controlling a cooling system of a gas turbine according to claim 1,
   wherein the differential pressure target value setting function determines a relationship among the differential pressure target value, the temperature of the cooling air, and a gas turbine output equivalent value, and
   in the step of determining the differential pressure target value, a differential pressure target value corresponding to the detected temperature of the cooling air and the gas turbine output equivalent value is determined using the differential pressure target value setting function.

3. The method for controlling a cooling system of a gas turbine according to claim 1,
   wherein the drive command corresponding to a driving amount, in which the correction driving amount is added to the preceding driving amount determined by the step of determining the preceding driving amount, is output as the drive command corresponding to the preceding driving amount and the correction driving amount in the step of outputting the drive command.

4. The method for controlling a cooling system of a gas turbine according to claim 3,
   wherein the preceding driving amount setting function determines a relationship among the temperature of the cooling air, a gas turbine output equivalent value, and the preceding driving amount of the cooling air flow regulator, and in the step of determining the preceding driving amount, the preceding driving amount corresponding to the detected temperature of the cooling air and the gas turbine output equivalent value is determined using the preceding driving amount setting function.

5. The method for controlling a cooling system of a gas turbine according to claim 1,
   wherein the cooling air flow regulator is disposed in an inlet port of the cooling air compressor to regulate the flow rate of the cooling air that is sucked by the cooling air compressor.

6. A control device of a cooling system of a gas turbine, the cooling system being provided with a cooler which cools compressed air extracted from an air compressor of the gas turbine to make cooling air, and a cooling air compressor that supplies the cooling air to a high temperature portion exposed to a combustion gas in the gas turbine, a thermometer which detects a temperature of the cooling air supplied to the high temperature portion, and a flow rate equivalent value meter which detects a flow rate equivalent value of the cooling air, comprising:
   a differential pressure target value setting unit including a differential pressure target value setting function that indicates a relationship between a differential pressure target value and a temperature of the cooling air, the differential pressure target value setting unit determining the differential pressure target value with respect to the flow rate equivalent value of the cooling air corresponding to the detected temperature of the cooling air, by using the differential pressure target value setting function, the differential pressure target value being a differential pressure between a first pressure at a first position where the compressed air is extracted from the air compressor of the gas turbine and a second pressure at a second position where the cooling air is supplied to the high temperature portion;
   a preceding driving amount setting unit that determines a preceding driving amount of a cooling air flow regulator using the detected temperature of the cooling air and a preceding driving amount setting function that indicates a relationship between the temperature of the cooling air and the preceding driving amount of the cooling air flow regulator that regulates a flow rate of the cooling air, the preceding driving amount which is used to perform a feed-forward control of the flow rate of the cooling air;
   a correction driving amount calculation unit that obtains a correction driving amount, which reduces a deviation of the detected flow rate equivalent value of the cooling air with respect to the differential pressure target value, as a correction driving amount of the cooling air flow regulator, and that is connected to the differential pressure target value setting unit; and
   a drive command output unit that outputs a drive command corresponding to the preceding driving amount and the correction driving amount to the cooling air flow regulator, and that is connected to the correction driving amount calculation unit.

7. The control device of a cooling system of a gas turbine according to claim 6,
   wherein the differential pressure target value setting function determines a relationship among the differential pressure target value, the temperature of the cooling air, and a gas turbine output equivalent value, and
   the differential pressure target value setting unit determines a target value corresponding to the detected temperature of the cooling air and the gas turbine output equivalent value, by using the differential pressure target value setting function.

8. The control device of a cooling system of a gas turbine according to claim 6,
wherein the differential pressure target value setting function is a function that indicates a relationship in which the differential pressure target value is increased as the temperature of the cooling air is increased.

9. The control device of a cooling system of a gas turbine according to claim 6,
wherein the drive command output unit outputs the drive command corresponding to a driving amount in which the correction driving amount is added to the preceding driving amount determined by the preceding driving amount setting unit.

10. The control device of a cooling system of a gas turbine according to claim 9,
wherein the preceding driving amount setting function determines a relationship among the temperature of the cooling air, a gas turbine output equivalent value, and the preceding driving amount of the cooling air flow regulator, and
the preceding driving amount setting unit determines the preceding driving amount corresponding to the detected temperature of the cooling air and the gas turbine output equivalent value, by using the preceding driving amount setting function.

11. A gas turbine plant comprising:
the control device of the cooling system of the gas turbine as in claim 6.

12. The gas turbine plant according to claim 11,
wherein the cooler includes a heat exchanger that exchanges heat between the compressed air from the air compressor and a cooling medium, and a medium flow regulator that regulates a flow rate of the cooling medium, and
the control device includes a drive command output unit that outputs a drive command to the medium flow regulator so that the temperature of the cooling air supplied to the high temperature portion is a temperature target value which is a target value of the temperature of the cooling air.

13. The gas turbine plant according to claim 12,
wherein the control device includes a temperature target value setting unit that determines a temperature target value, which is a target value of the temperature of the cooling air supplied to the high temperature portion, corresponding to a gas turbine output equivalent value, by using a temperature target value setting function that indicates a relationship between the temperature target value and the gas turbine output equivalent value.

14. The gas turbine plant according to claim 12,
wherein the heat exchanger of the cooler is a radiator that exchanges heat between the compressed air and an air as a cooling medium, and the medium flow regulator of the cooler is a fan that can regulate a flow rate of the air supplied to the radiator.

15. The gas turbine plant according to claim 14, further comprising,
a fuel preheater that exchanges heat between the air supplied from the fan to the radiator and a fuel supplied to a combustor of the gas turbine and heats the fuel.

16. The gas turbine plant according to claim 14, further comprising:
an exhaust heat recovery boiler that generates steam by exchanging heat with the combustion gas exhausted from the gas turbine;
a first fuel preheater that exchanges heat between the air supplied from the fan to the radiator and a fuel supplied to the combustor of the gas turbine and heats the fuel; and
a second fuel preheater that exchanges heat between the fuel and the steam or heated water generated by the exhaust heat recovery boiler and heats the fuel.

17. The gas turbine plant according to claim 12, further comprising,
an exhaust heat recovery boiler that generates steam by exchanging heat with the combustion gas exhausted from the gas turbine,
wherein the heat exchanger of the cooler is a boiler water preheater that exchanges heat between water supplied to the exhaust heat recovery boiler as the cooling medium and the compressed air, and the medium flow regulator of the cooler is a water flow regulator that regulates a flow rate of the water supplied to the boiler water preheater.

18. The gas turbine plant according to claim 11,
wherein the cooling air flow regulator is disposed in an inlet port of the cooling air compressor to regulate the flow rate of the cooling air that is sucked by the cooling air compressor.

19. The control device of a cooling system of a gas turbine according to claim 6,
wherein the cooling air flow regulator is disposed in an inlet port of the cooling air compressor to regulate the flow rate of the cooling air that is sucked by the cooling air compressor.

* * * * *